US008451091B2

(12) United States Patent
Hioki et al.

(10) Patent No.: US 8,451,091 B2
(45) **Date of Patent: *May 28, 2013**

(54) CONTROL SYSTEM, ELECTRONIC CONTROL UNIT, AND COMMUNICATION METHOD

(75) Inventors: Toshikazu Hioki, Kariya (JP); Takeshi Iwai, Anjo (JP); Housyo Yukawa, Oobu (JP); Fumitaka Sugimoto, Nukata-gun (JP); Hirofumi Isomura, Kariya (JP)

(73) Assignee: Denso Corporation, Kariya (JP)

( * ) Notice: Subject to any disclaimer, the term of this patent is extended or adjusted under 35 U.S.C. 154(b) by 697 days.

This patent is subject to a terminal disclaimer.

(21) Appl. No.: 12/638,163

(22) Filed: Dec. 15, 2009

(65) Prior Publication Data

US 2010/0161080 A1 Jun. 24, 2010

(30) Foreign Application Priority Data

Dec. 22, 2008 (JP) ................................ 2008-325659

(51) Int. Cl.
*G08B 1/08* (2006.01)
*H04Q 1/30* (2006.01)
*H04L 12/40* (2006.01)

(52) U.S. Cl.
USPC ............. 340/10.1; 340/2.1; 340/2.4; 340/2.8; 340/533; 340/534; 370/438; 370/439

(58) Field of Classification Search
USPC ................. 340/518, 524, 2.1, 2.4, 2.8, 10.31, 340/12.1, 3.54, 533–538.17; 370/533–538.17, 370/438, 439
See application file for complete search history.

(56) References Cited

U.S. PATENT DOCUMENTS

| | | | | |
|---|---|---|---|---|
| 4,229,734 | A * | 10/1980 | Schultz | 340/512 |
| 5,404,137 | A * | 4/1995 | Levien | 340/3.9 |
| 2008/0059038 | A1 * | 3/2008 | Yoshida et al. | 701/99 |
| 2010/0161080 | A1 | 6/2010 | Hioki et al. | |
| 2011/0313640 | A1 | 12/2011 | Hioki et al. | |

FOREIGN PATENT DOCUMENTS

| | | | |
|---|---|---|---|
| JP | 59-126351 | | 7/1984 |
| JP | 59126351 | A * | 7/1984 |
| JP | 8-65756 | | 3/1996 |
| JP | 11-313128 | | 11/1999 |
| JP | 2008-57413 | | 3/2008 |
| JP | 2008-057413 | | 3/2008 |
| JP | 2010-144692 | | 7/2010 |

* cited by examiner

*Primary Examiner* — Daniel Wu
*Assistant Examiner* — John Bamert
(74) *Attorney, Agent, or Firm* — Nixon & Vanderhye P.C.

(57) ABSTRACT

The present invention provides, as one aspect, a control system having sensor units and an electronic control unit. The electronic control unit includes a transmission controlling means which sets a signal line connected to the sensor unit, which is a destination of communication data, to a first state, sets the signal line connected to the sensor unit, which is not the destination, to a second state, and transmits the communication data to the destination via a communication line. The sensor unit includes a reception controlling means which determines a state of the signal line connecting a sensor to the electronic control unit. When determining that the signal line of the sensor unit is in the first state, the reception controlling means receives the communication data and performs a predetermined process. When determining that the signal line is in the second state, the reception controlling means discards the communication data.

6 Claims, 6 Drawing Sheets

CONTROL SYSTEM, ELECTRONIC CONTROL UNIT, AND COMMUNICATION METHOD

CROSS REFERENCE TO RELATED APPLICATION

This application is based on and claims the benefit of priority from earlier Japanese Patent Application No. 2008-325659 filed Dec. 22, 2008, the description of which is incorporated herein by reference.

BACKGROUND OF THE INVENTION

1. Technical Field of the Invention

The present invention relates to a control system, an electronic control unit, and a communication method. The control system includes a plurality of sensors and the electronic control unit.

2. Related Art

In the technical field of vehicle control, drive units are conventionally known into which a sensor and an actuator are integrated. As an example of the drive units, a unit is known in which a memory is included for storing individual characteristic values, as disclosed in, for example, Japanese Unexamined Patent Application Publication No. 2008-057413.

Initial characteristic values are written into the memory of the drive unit when the product is shipped. The characteristic values are used in an electronic control unit (ECU) for controlling the drive unit.

In addition, a technique is known in which learning values obtained by an electronic control unit are written into a memory of a drive unit to prevent loss of the learning values due to replacement of the electronic control unit or the like.

Incidentally, when using techniques in which an actuator and a memory are integrated and initial characteristic values or learning values are written into the memory, an electronic control unit is required to read the initial characteristic values from a drive unit or write the learning values into the drive unit. Therefore, the drive unit is required to be provided with a communication function.

A method can be provided for connecting a plurality of drive units to an electronic control unit to enable the communication therebetween. According to the method, for example, the drive units are connected to the electronic control unit via individual communication lines. When using such a method, the electronic control unit is required to be provided with individual communication devices for the drive units. Therefore, the drive units are preferably connected to the electronic control unit via a common communication line, that is, a bus.

However, when using the method by which the bus communication is used, individual node IDs are assigned to the drive units to perform communication between the electronic control unit and the drive units depending on the node IDs. Therefore, when the node IDs are incorrectly assigned to the drive units, disadvantages arise.

As an example, a case will be considered where injectors for cylinders are connected to an electronic control unit via a common communication line. Fuel injection through the injectors is controlled, as is well known, in such a manner that an injection signal is outputted from the electronic control unit to an electronic drive unit (EDU), and the electronic drive unit drives the injector based on the injection signal. That is, the fuel injection through the injectors is controlled via a line different from that used for memory access performed from the electronic control unit to the injectors via the communication line.

Hereinafter, a case is considered where an electronic control unit obtains characteristic values from injectors via a communication line on the assumption that a node ID of "1" is assigned to an injector of a first cylinder and a node ID of "2" is assigned to an injector of the a second cylinder. However, in this case, the injector to which the node ID "2" is assigned could be incorrectly mounted in the first cylinder and the injector to which the node ID "1" is assigned could be incorrectly mounted in the second cylinder.

In the above case, the electronic control unit reads a characteristic value of the injector of the second cylinder as a characteristic value of the injector of the first cylinder from the injector to which the node ID "1" has been assigned and which is mounted in the second cylinder. Then, the electronic control unit controls the injector of the first cylinder based on the characteristic value read. This cases problems with control.

Problems similar to the above case are also caused in a case where a sensor signal indicating a physical quantity measured by a sensor is received by an electronic control unit as an analog signal without a communication line. As an example, a case will be considered where individual signal lines, which transmit sensor signals, are provided for drive units in addition to the communication line.

In this case, although the connection relationship between the sensor included in the drive unit and the electronic control unit is physically determined by the signal line, the connection relationship between a memory included in the drive unit and the electronic control unit is logically determined by a node ID.

Consequently, in a system in which a sensor included in a drive unit having a node ID of "1" should be connected to a first signal line and a sensor included in a drive unit having a node ID of "2" should be connected to a second signal line, when the sensor included in the drive unit having the node ID of "2" is incorrectly connected to the first signal line and the sensor included in the drive unit having the node ID of "1" is incorrectly connected to the second signal line, the electronic control unit corrects a sensor signal received via the first signal line from the drive unit having the node ID of "2" and connected to the first signal line based on a characteristic value obtained via the communication line from the drive unit having the node ID of "1" and connected to the second signal line. This cases a problem that physical quantity measured by the sensor cannot be correctly corrected.

SUMMARY OF THE INVENTION

The present invention has been made in consideration of the foregoing conventional situation, and an object of the present invention is to provide a control system, an electronic control unit, and a communication method which prevent disadvantages from arising due to incorrect mounting of a sensor unit in which a node ID has previously been registered.

In order to achieve the object, the present invention provides, as one aspect, a control system having a plurality of sensor units and an electronic control unit, each of the sensor units including a sensor and a communication device, the electronic control unit being connected to the communication devices included in the sensor units via a common communication line, and the electronic control unit being connected to the sensors included in the sensor units via signal lines individually provided for the sensor units, wherein the electronic control unit comprises a transmission controlling means which sets the signal line connected to the sensor unit, which is a destination of communication data, to a first state, sets the signal line connected to the sensor unit, which is not the destination of the communication data, to a second state, and transmits the communication data to the sensor unit, which is the destination, via the communication line, each of the sensor units comprises a reception controlling means which determines a state of the signal line connecting the sensor included in the sensor unit to the electronic control unit, when the reception controlling means determines that the signal line of the sensor unit is in the first state, the reception controlling means receives the communication data received by the communication device and performs a predetermined process based the communication data, and when the reception controlling means determines that the signal line of the sensor unit is in the second state, the reception controlling means discards the communication data received by the communication device.

DETAILED DESCRIPTION OF THE PREFERRED EMBODIMENTS

Figure 1:
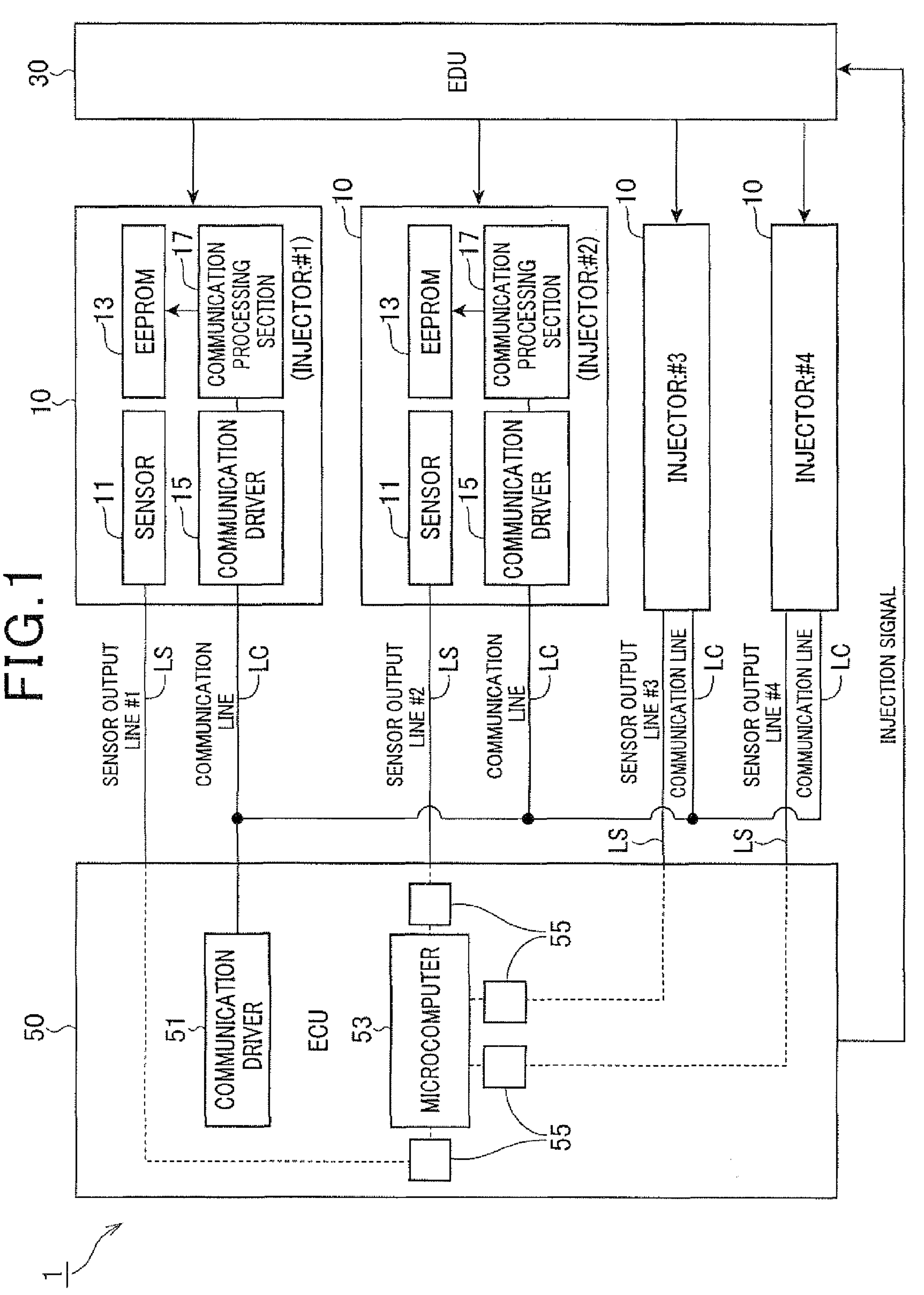
FIG. 1 is a block diagram showing an overall configuration of an injector driving system.

Hereinafter, embodiments of the present invention will be described with reference to the accompanying drawings. FIG. 1 is a block diagram showing an overall configuration of an injector driving system 1 of an embodiment.

The injector driving system 1 of the present embodiment is installed in a vehicle in which a four-cylinder engine is driven. The injector driving system 1 comprises injectors 10 for cylinders, an electronic drive unit (EDU) 30 which drives the injectors 10, and an electronic control unit (ECU) 50 which controls fuel injection of the injectors 10.

Each of the injectors 10 for the cylinders of the injector driving system 1 incorporates a pressure sensor 11, which measures fuel injection pressure, and an EEPROM 13, which is a rewritable nonvolatile memory and stores characteristic values of the sensor and the injector.

In addition, the injector 10 has a function of transmitting the characteristic values stored in the EEPROM 13 to the electronic control unit 50 and a function of writing learning values concerning the characteristic values transmitted from the electronic control unit 50 into the EEPROM 13 to update the characteristic values stored in the EEPROM 13.

Specifically, the injector 10 comprises a communication driver 15, which is connected to a communication line (bus) LC common to the cylinders, and a communication processing section 17. The communication processing section 17 generates communication data to be transmitted and outputs the communication data to the communication driver 15. In addition, the communication processing section 17 performs a predetermined process based on the communication data received by the communication driver 15.

Each of the communication drivers 15 installed in the injectors 10 is connected to the electronic control unit 50 via the communication line (bus) LC. The communication driver 15 outputs the communication data, which is received via the communication line LC, to the communication processing section 17 thereof, and outputs the communication data to be transmitted, which is received from the communication processing section 17, to the communication line LC, thereby realizing the communication between the injector 10 and the electronic control unit 50.

The communication line LC is used for transmitting and receiving the characteristic values between the injector 10 and the electronic control unit 50. Sensor signals, which are output signals of the pressure sensors 11 of the injectors 10 and indicate measurement results of the pressure, are transmitted via lines different from the communication line LC.

Specifically, in the injector driving system 1, the sensor signals outputted from the pressure sensors 11 are received as analog signals by the electronic control unit 50 via respective sensor output lines LS of the injectors 10.

That is, the injector driving system 1 has the sensor output lines LS corresponding to the pressure sensors 11. The sensor output lines LS connect the pressure sensors 11 with the electronic control unit 50 to transmit the sensor signals from the pressure sensors 11 to the electronic control unit 50. The sensor signals of the pressure sensors 11 incorporated in the injectors 10 are outputted to the electronic control unit 50 via the sensor output lines LS.

The electronic control unit 50 comprises a communication driver 51, which is connected to the communication line LC connecting to the communication drivers 15 of the injectors 10 for cylinders, and a microcomputer 53, which performs a communication process between the electronic control unit 50 and the injectors 10 via the communication driver 51 and controls fuel injection of the injectors 10.

In the electronic control unit 50, the microcomputer 53 outputs an injection signal (in other words, an injector driving signal) to the electronic drive unit 30 via a control line different from the communication line LC and the sensor output lines LS, thereby realizing the fuel injection control.

The sensor output lines LS of the injectors 10 are connected to the microcomputer 53 via state changing circuits 55 which change the states of the sensor output lines LS. The microcomputer 53 changes the states of the sensor output lines LS via the state changing circuits 55 to inform the injector 10 connected to one sensor output line LS that the injector 10 is the destination of communication data (as described later in detail).

That is, the state changing circuits 55 are controlled by the microcomputer 53 to change the states of the sensor output lines LS. Specifically, the state changing circuit 55 changes the electric potential of the sensor output line LS to High or Low (0V).

Figure 2:
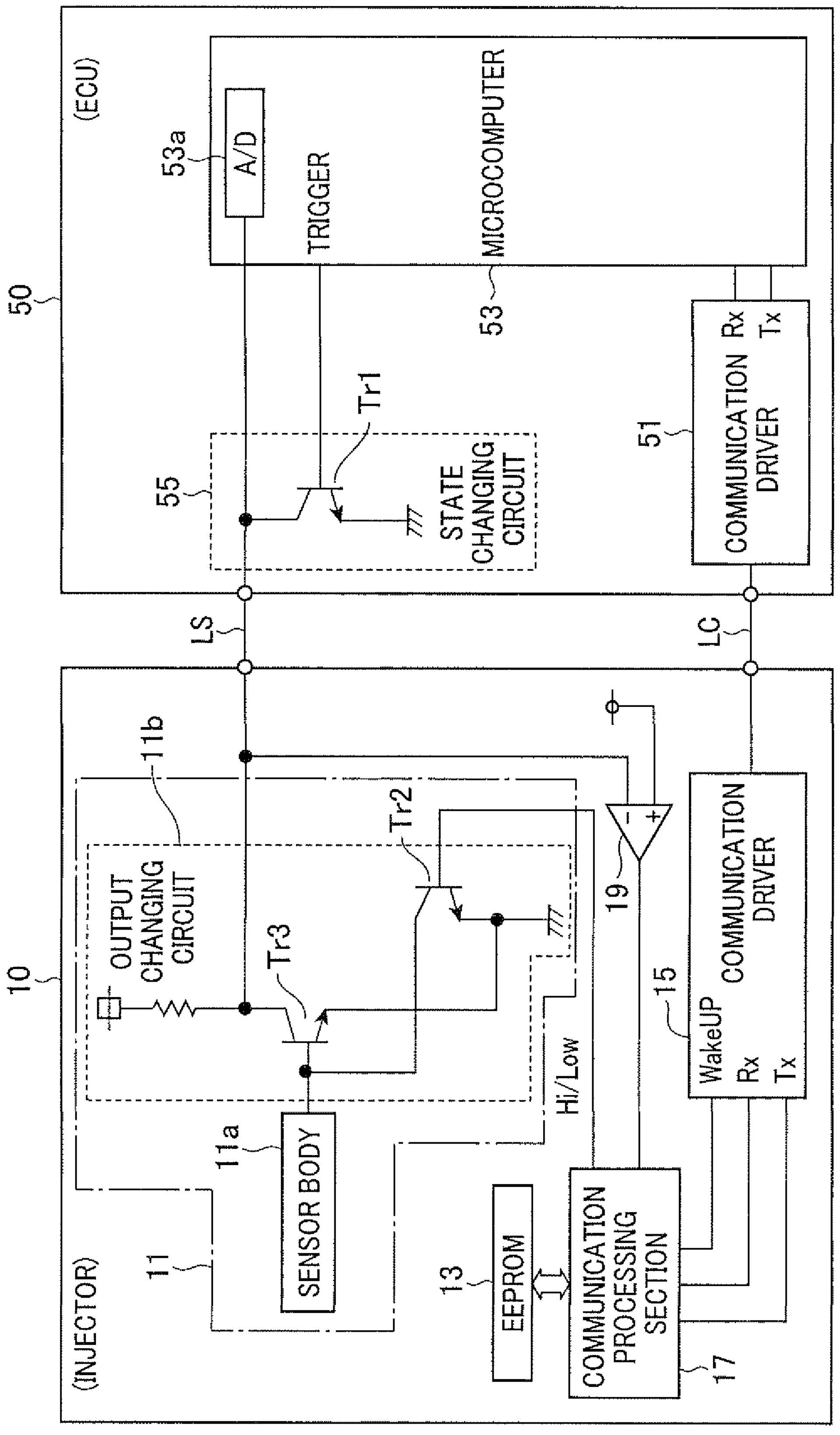
FIG. 2 is a block diagram showing a configuration of an injector and an electronic control unit.

The microcomputer 53 incorporates, as shown in FIG. 2, an A/D converter 53*a* which corresponds to the sensor output lines LS for cylinders. The sensor signal received by the electronic control unit 50 via the sensor output line LS and the state changing circuit 55 is converted by the A/D converter 53*a* to a digital signal. The digital signal is used by the microcomputer 53 for controlling fuel injection.

A measurement value, which is indicated by the sensor signal of the pressure sensor 11 received by the electronic control unit 50, is corrected based on the characteristic value read by the microcomputer 53 from the corresponding injector 10 via the communication line LC. The corrected measurement value is used for controlling fuel injection.

FIG. 2 is a block diagram showing a detailed configuration of the injector 10 and the electronic control unit (ECU) 50 of the injector driving system 1.

As shown in FIG. 2, the pressure sensor 11 incorporated in the injector 10 consists of a sensor body 11*a* and an output changing circuit 11*b* connected to the sensor output line LS. When the base of a transistor Tr2 receives a Low signal from the communication processing section 17, the output changing circuit 11*b* transmits the sensor signal outputted from the sensor body 11*a* to the sensor output line LS via the collector of a transistor Tr3. Conversely, when the base of the transistor Tr2 receives a High signal from the communication processing section 17, the output changing circuit 11*b* grounds the output terminal of the sensor body 11*a* to set the transistor Tr3 to OFF. In consequence, the sensor output line LS is interrupted with respect to the sensor body 11*a*, which produces a state in which power supply voltage is applied to the sensor output line LS.

Specifically, when the communication driver 15 receives a Wake-Up command via the communication line LC and transfers the Wake-Up command to the communication processing section 17, the communication processing section 17 changes a base signal outputted to the transistor Tr2 from a Low signal to a High signal to set the transistor Tr2 to ON. When the communication driver 15 receives a Sleep command via the communication line LC, the communication processing section 17 changes a base signal outputted to the transistor Tr2 from a High signal to a Low signal to set the transistor Tr2 to OFF.

Hereinafter, the state in which the transistor Tr2 is turned ON and the sensor output line LS is interrupted with respect to the sensor body 11*a* is referred to as a "sensor non-outputting state" of the sensor output line LS. The state in which the transistor Tr2 is turned OFF and a sensor signal is transmitted from the sensor body 11*a* to the sensor output line LS is referred to as a "sensor outputting state" of the sensor output line LS.

In addition, the injector 10 has, as shown in FIG. 2, a comparator 19 connected to the sensor output line LS. The comparator 19 compares the electric potential of the sensor output line LS with a predetermined voltage to determine whether the electric potential of the sensor output line LS is High or Low. The comparator 19 outputs the determination result to the communication processing section 17.

The electronic control unit 50 turns the transistor Tr1 of the state changing circuits 550N or OFF after the Wake-Up command is transmitted. Thereby, the electric potential of the sensor output line LS is changed to Low or High. In consequence of the changing of the state of the sensor output line LS, information of the destination of communication data is provided from the electronic control unit 50 to the injector 10.

As shown in FIG. 2, the electronic control unit 50 has the state changing circuits 55 having the following functions. That is, when the base of the transistor Tr1 receives a High signal from the microcomputer 53, the transistor Tr1 turns ON to set the electric potential of the sensor output line LS to Low (0V). When the base of the transistor Tr1 receives a Low signal from the microcomputer 53, the transistor Tr1 turns OFF, whereby a sensor signal transmitted through the sensor output line LS is received by the microcomputer 53.

In a state where the transistor Tr2 of the injector 10 is turned ON, when the transistor Tr1 of the electronic control unit 50 is changed from ON to OFF, the electric potential of the sensor output line LS is changed from Low to High. Such a change in the electric potential is detected by the comparator 19 in the injector 10.

Next, a communication control process performed by the communication processing section 17 of the injector 10 will be described with reference to FIG. 3. On receiving a Wake-Up command via the communication driver 15, the communication processing section 17 starts the communication control process shown in FIG. 3.

Figure 3:
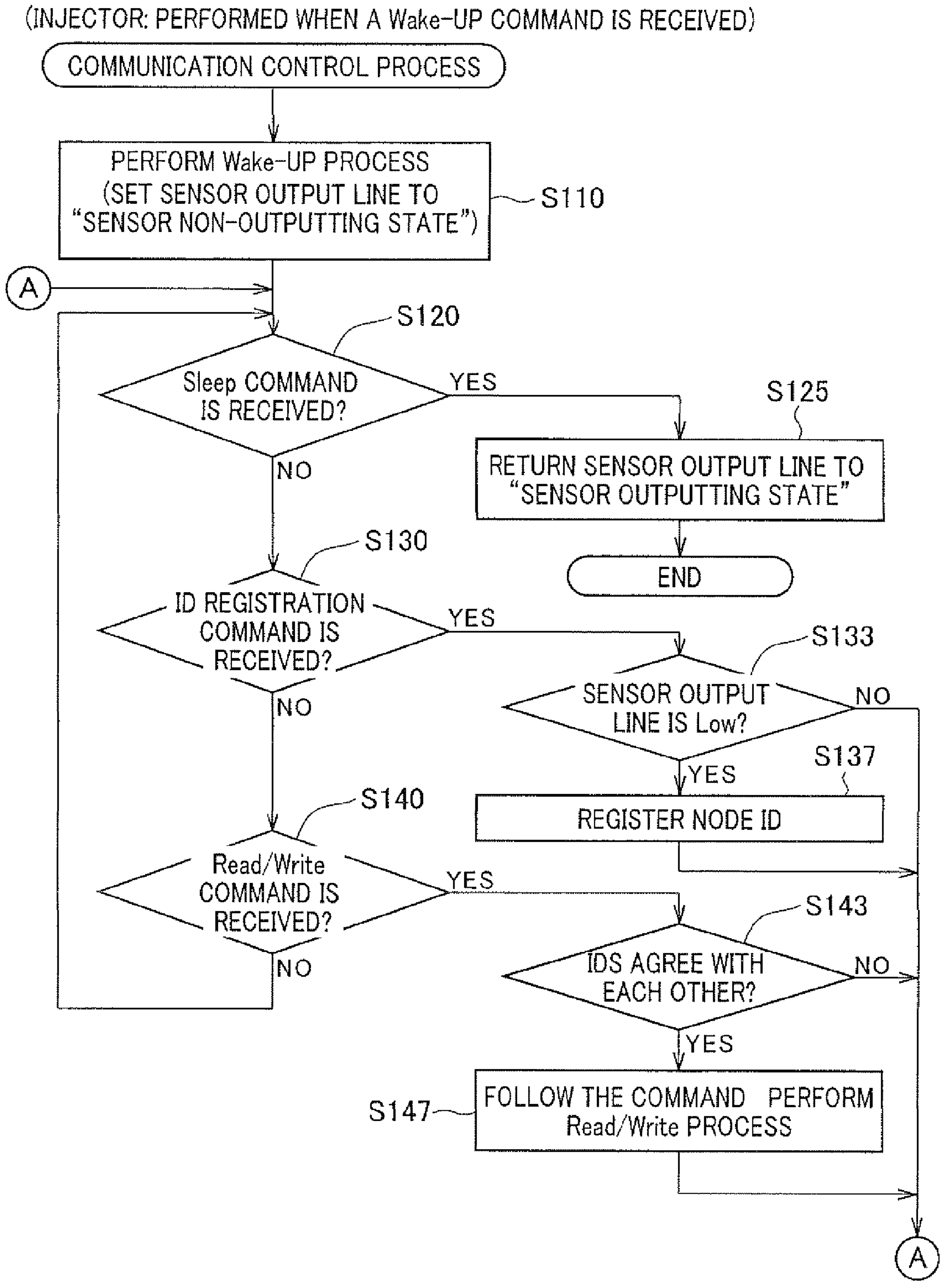
FIG. 3 is a flowchart showing a communication control process performed by a communication processing section.

On starting the communication control process shown in FIG. 3, the communication processing section 17 performs a Wake-Up process which is the process performed in accordance with the Wake-Up command (S110). In the Wake-Up process, the sensor output line LS connected to the pressure sensors 11 of the injector 10, in which the communication processing section 17 is included, is changed from the "sensor outputting state" to the "sensor non-outputting state".

Specifically, in the Wake-Up process, a signal outputted to the transistor Tr2 of the output changing circuit 11*b* is changed from a Low signal to a High signal, thereby changing the sensor output line LS, to which the injector 10 is connected, to the "sensor non-outputting state".

When the above process ends, the communication processing section 17 proceeds to step S120, and waits until the communication processing section 17 receives a Sleep command, an ID registration command, a Read command, or a Write command from the electronic control unit 50 via the communication driver 15 (S120, S130, S140).

When the communication processing section 17 receives the Sleep command (Yes in step S120), the communication processing section 17 performs a Sleep process in accordance with the Sleep command. In the Sleep process, the sensor output line LS connected to the pressure sensors 11 of the injector 10, in which the communication processing section 17 is included, is changed from the "sensor non-outputting state" to the "sensor outputting state" (S125).

Specifically, in the Sleep process, a base signal outputted to the transistor Tr2 of the output changing circuit 11*b* is changed from a High signal to a Low signal, thereby changing the sensor output line LS, to which the injector 10 is connected, to the "sensor outputting state". Thereafter, the communication control process is completed.

When the communication processing section 17 receives the ID registration command (Yes in step S130), the communication processing section 17 determines based on the state of the sensor output line LS thereof whether or not the destination of the ID registration command received is the injector 10 including the communication processing section 17 itself (S133). Note that the ID registration command is the communication data which requires registering a node ID and includes information of the node ID to be registered.

In step S133, when the communication processing section 17 has received from the comparator 19 a signal (the determination result) indicating that the electric potential of the sensor output line LS is Low, the communication processing section 17 determines that the destination of the ID registration command received is the injector 10 including the communication processing section 17 itself (Yes in S133). Then, the communication processing section 17 registers the node ID, which is indicated as "node ID to be registered" by the ID registration command, as the node ID of the injector 10 including the communication processing section 17 itself (S137). For example, the communication processing section 17 writes the node ID of the injector 10 including the communication processing section 17 itself into the EEPROM 13. Thereafter, the communication processing section 17 proceeds to step S120, and waits until the communication processing section 17 receives the next command.

In step S133, when the communication processing section 17 has received from the comparator 19 a signal indicating that the electric potential of the sensor output line LS is High, the communication processing section 17 determines that the destination of the ID registration command received is not the injector 10 including the communication processing section 17 itself (No in S133). Then, the communication processing section 17 does not perform the process of step S137, and proceeds to step S120. That is, the communication processing section 17 does not perform the process in accordance with the ID registration command received, and discards the ID registration command.

In addition, when the communication processing section 17 receives a Read command or Write command (Yes in S140), the communication processing section 17 proceeds to step S143, and determines based on the node ID attached to the command as destination information whether or not the destination of the Read command or Write command is the injector 10 including the communication processing section 17 itself. Note that the Read command is the communication data for instructing the communication processing section 17 to read data from the EEPROM 13. The Write command is the communication data for instructing the communication processing section 17 to write the data to be written included in the Write command into the EEPROM 13. When the Read command/Write command is transmitted from the electronic control unit 50, information of a node ID of the destination (object of command) is attached to the Read command/Write command.

That is, in step S143, the communication processing section 17 determines whether or not the command received is a command for the injector 10 including the communication processing section 17 itself based on whether or not the node ID attached to the command as information of the destination agrees with the node ID of the injector 10. When it is determined that the command received is a command for the injector 10 (Yes in S143), the communication processing section 17 performs the process in accordance with the command received (S147).

For example, when the command received is a Read command, the communication processing section 17 reads the data to be read designated by the command from the EEPROM 13, and transmits the data to the electronic control unit 50 via the communication driver 15. When the command received is a Write command, the communication processing section 17 writes the data to be written included in the command into the EEPROM 13.

In this manner, the injector 10 of the present embodiment transmits the characteristic values stored in the EEPROM 13 to the electronic control unit 50 and writes the learning values received from the electronic control unit 50 into the EEPROM 13.

When the process of step S147 ends, the communication processing section 17 proceeds to step S120 and waits until the communication processing section 17 receives a next command.

When it is determined that the command received is not a command for the injector 10 including the communication processing section 17 itself (No in S143), the communication processing section 17 does not perform the process of step S147, and proceeds to step S120, in which the communication processing section 17 discards the command received.

Figure 4:
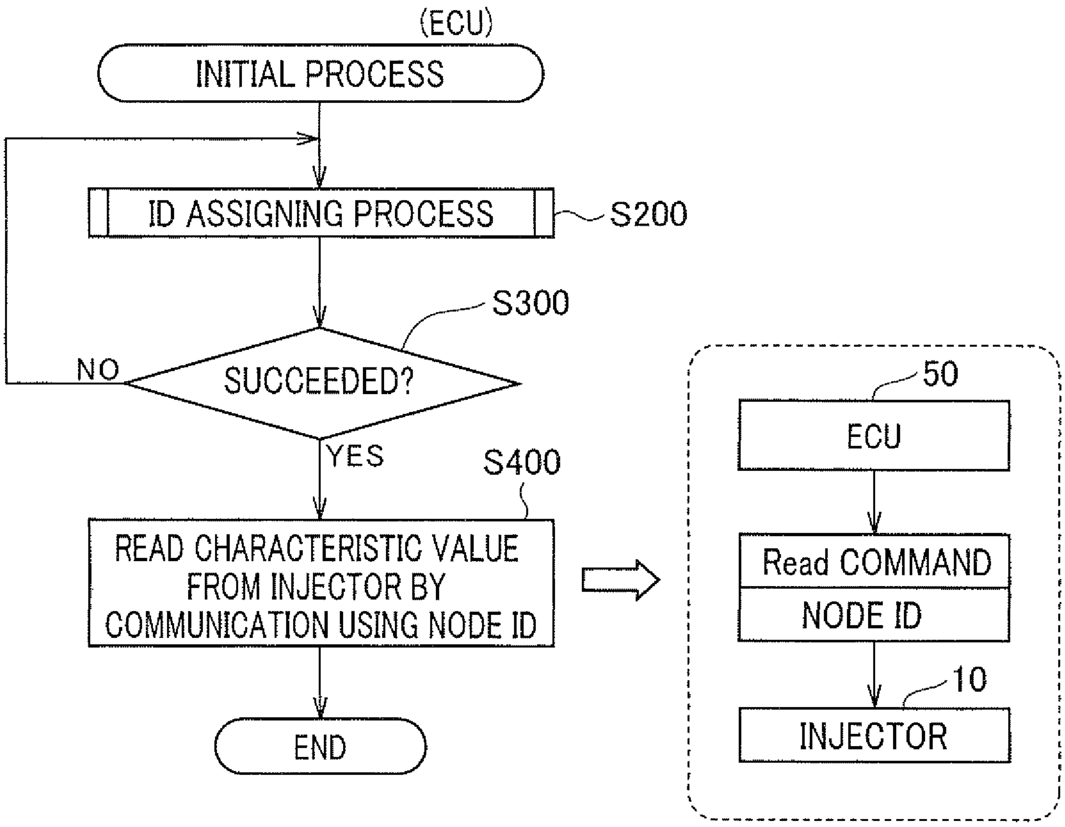
FIG. 4 is a flowchart showing an initial process performed by a microcomputer.

Next, an initial process performed by the microcomputer 53 of the electronic control unit 50 will be described with reference to FIG. 4. FIG. 4 is a flowchart showing the initial process performed by the microcomputer 53. In the initial process, a node ID is assigned to each of the injectors 10 of the cylinders, and a communication system is set up.

The electronic control unit 50 may be configured to perform the initial process every time the electronic control unit 50 starts up. Alternatively, the electronic control unit 50 may be configured to perform the initial process when the electronic control unit 50 receives a command from the outside to perform an initial setup.

Figure 5:
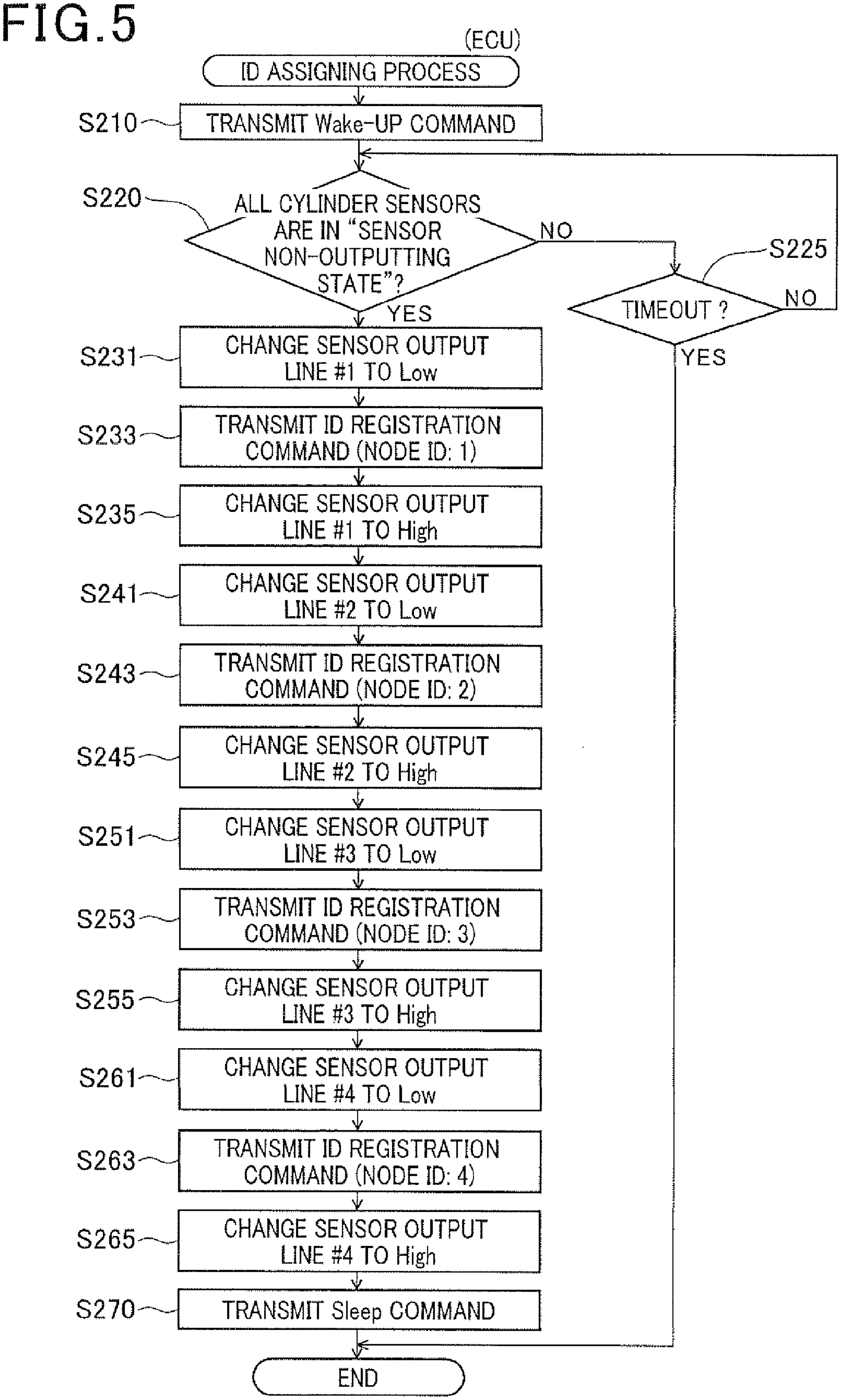
FIG. 5 is a flowchart showing an ID assigning process performed by the microcomputer.

On starting the initial process shown in FIG. 4, in step S200, the microcomputer 53 performs an ID assigning process shown in FIG. 5. FIG. 5 is a flowchart showing the ID assigning process performed by the microcomputer 53.

On starting the ID assigning process, the microcomputer 53 outputs the Wake-Up command to the communication line LC via the communication driver 51 to transmit the Wake-Up command to the injectors 10 connected to the communication line LC (S210).

When the above process ends, the microcomputer 53 determines based on the signals (electric potential) received from the sensor output lines LS of the injectors 10 whether or not all the sensor output lines LS of the cylinders have changed to the "sensor non-outputting state" (S220). Then, the microcomputer 53 waits until all the sensor output lines LS change to the "sensor non-outputting state" or predetermined waiting time passes from the time when the Wake-Up command is transmitted (S220, S225).

When the waiting time has passed in a state where not all the sensor output lines LS change to the "sensor non-outputting state" (Yes in step S225), it is assumed that an error has occurred. Then, the ID assigning process is completed (timeout process).

When all the sensor output lines LS have changed to the "sensor non-outputting state" before the waiting time passes (Yes in step S220), the microcomputer 53 proceeds to step S231. In step S231, the microcomputer 53 performs a process, in which a node ID of "1" is assigned to the injector 10 connected to the sensor output line LS of the first cylinder (S231, S233, S235).

Specifically, in step S231, a base signal outputted to the transistor Tr1 of the state changing circuit 55 connected to the sensor output line LS of the first cylinder is changed from a Low signal to a High signal, thereby changing the electric potential of the sensor output line LS of the first cylinder to Low. Thereafter, the microcomputer 53 outputs an ID registration command, in which the node ID of "1" to be registered is written, to the communication line LC via the communication driver 51 (S233).

In the initial state, the bases of the transistors Tr1 of the state changing circuits 55 for the cylinders have received a Low signal from the microcomputer 53. Therefore, as shown in FIG. 6, when the ID registration command is transmitted, only the sensor output line LS of the first cylinder is set to Low, and all the other sensor output lines LS are set to High.

Therefore, when the ID registration command is transmitted in step S233, only the injector 10 connected to the sensor output line LS of the first cylinder determines that the destination of the ID registration command received via the communication driver 15 is the injector 10 itself. In consequence, the injector 10 resisters the node ID of "1" for the injector 10 itself.

Figure 6:
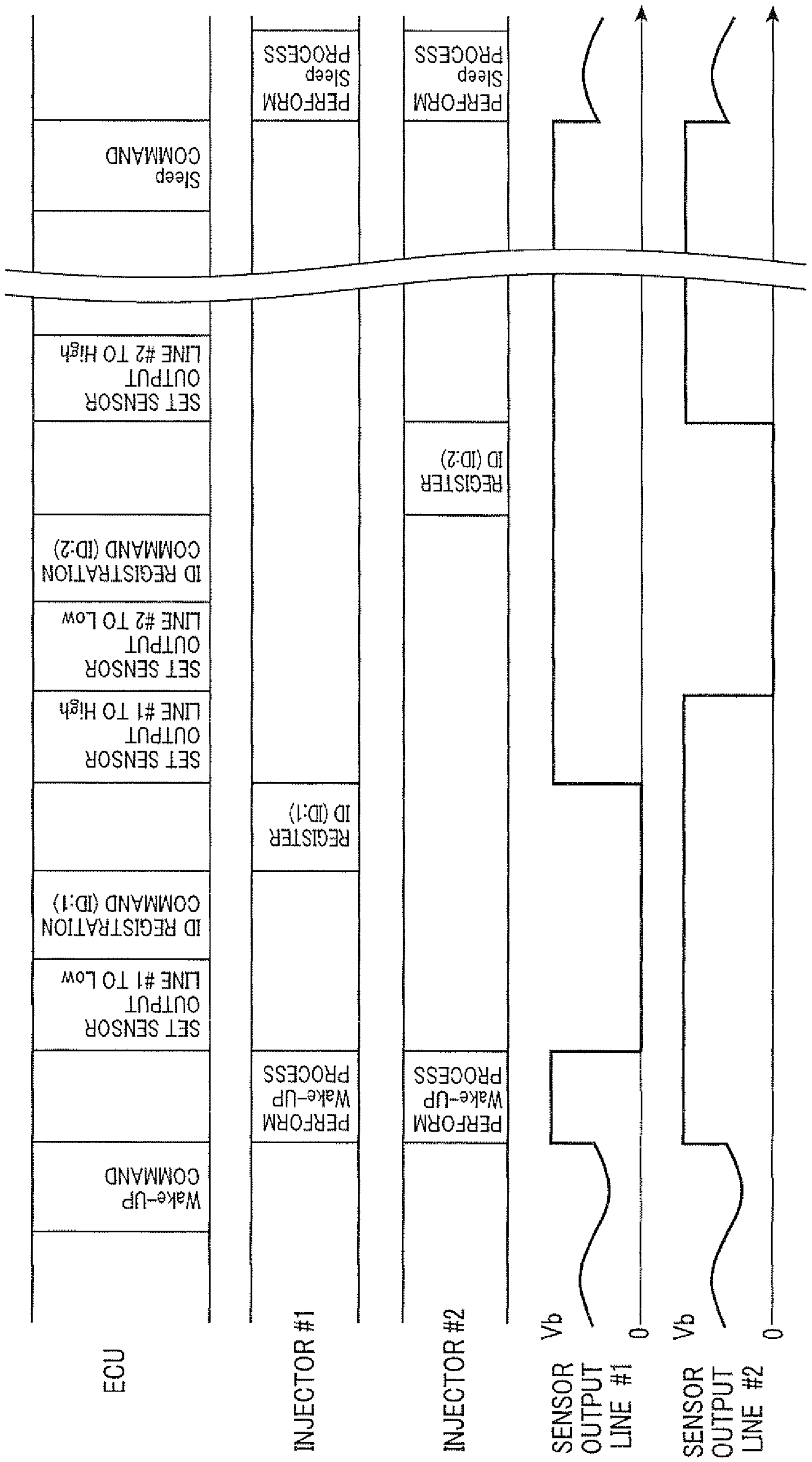
FIG. 6 is a time chart showing operations of the electronic control unit and the injectors and states of sensor output lines.

FIG. 6 is a time chart showing a relationship between commands outputted from the microcomputer 53 in the ID assigning process, and operations of the injectors 10 and states of the sensor output lines LS thereof. In the time chart, operations of the third and fourth injectors 10 and states of the sensor output lines LS thereof are not shown.

After the ID registration command is transmitted, the microcomputer 53 changes the signal outputted to the state changing circuit 55 from a High signal to a Low signal, when the registration of the node ID by the corresponding injector 10 is expected to be completed. Thereby, the electric potential of the sensor output line LS of the first cylinder returns to High (S235).

The microcomputer 53 completes the process in which a node ID is assigned to the injector 10 connected to the sensor output line LS of the first cylinder according to the above procedure.

When the process of step S235 ends, the microcomputer 53 proceeds to step S241, in which the microcomputer 53 assigns a node ID of "2" to the injector 10 connected to the sensor output line LS of the second cylinder (S241, S243, S245).

That is, in step S241, the microcomputer 53 changes the electric potential of the sensor output line LS of the second cylinder to Low via the state changing circuit 55 connected to the sensor output line LS of the second cylinder. Thereafter, the microcomputer 53 outputs an ID registration command, in which the node ID of "2" to be registered is written, to the communication line LC via the communication driver 51 (step S243).

As described above, in step S235, the electric potential of the sensor output line LS of the first cylinder, which is set to Low in step S231, returns to High. Therefore, when the electric potential of the sensor output line LS of the second cylinder is changed to Low in step S241, the electric potentials of the sensor output lines LS of the cylinders other than that of the sensor output line LS of the second cylinder are High.

Therefore, when the ID registration command is transmitted in step S243, only the injector 10 connected to the sensor output line LS of the second cylinder determines that the destination of the ID registration command received via the communication driver 15 is the injector 10 itself. In consequence, the injector 10 registers the node ID of "2" therein.

After the ID registration command is transmitted, the microcomputer 53 returns the electric potential of the sensor output line LS of the second cylinder to High via the state changing circuit 55, when the registration of the node ID by the corresponding injector 10 is expected to be completed, as in the case of the process of step S235 (S245). The microcomputer 53 completes the process in which a node ID is assigned to the injector 10 connected to the sensor output line LS of the second cylinder according to the above procedure.

When the above process ends, the microcomputer 53 proceeds to step S251, in which the microcomputer 53 assigns a node ID of "3" to the injector 10 connected to the sensor output line LS of the third cylinder as in the same way described above (S241, S243, S245).

Furthermore, after the above process is performed, the microcomputer 53 proceeds to step S261, in which the microcomputer 53 assigns a node ID of "4" to the injector 10 connected to the sensor output line LS of the fourth cylinder as in the same way described above (S261, S263, S265).

Then, after the node IDs are assigned to all the injectors 10 of all the cylinders according to the processes described above, the microcomputer 53 outputs a Sleep command to the communication line LC (S270). Thereby, the communication control process shown in FIG. 3 is completed in the injectors 10 connected to the communication line LC, and the ID assigning process is completed.

After the ID assigning process of step S200 is completed, the microcomputer 53 proceeds to step S300, in which the microcomputer 53 determines whether or not the ID assigning process of step S200 has succeeded. When the timeout process has been performed (Yes in step S225), the microcomputer 53 determines that the ID assigning process has failed (No in step S300). Then, the microcomputer 53 performs the ID assigning process again (S200).

Conversely, when the microcomputer 53 determines that the ID assigning process has succeeded (Yes in step S300), the microcomputer 53 reads a characteristic value stored in the EEPROM 13 of the injector 10 of each cylinder by using the node ID assigned to the injector 10 of each cylinder.

Specifically, when reading a characteristic value from the injector 10 of the i-th cylinder (i=1, 2, 3, or 4), the microcomputer 53 outputs a Read command, to which a node ID (value "i") assigned to the injector 10 of the i-th cylinder is attached as destination information, to the communication line LC to read the characteristic value. Thereby, the microcomputer 53 makes the injector 10 of the i-th cylinder whose node ID is "i" process the Read command. In consequence, the microcomputer 53 obtains the characteristic value from the injector 10 of the i-th cylinder via the communication line LC (S400).

As can be understood from the flowchart shown in FIG. 3, the injector 10 accepts the Read/Write command during only a period between the time when the Wake-Up process ends and the time when the Sleep process starts. Therefore, in step S400, the microcomputer 53 transmits a Wake-Up command before transmitting a Read command. Finally, the microcomputer 53 transmits a Sleep command to the injector 10, whereby the process of step S400 ends.

When the above process ends, the microcomputer 53 completes the initial process. As described above, the characteristic values obtained by the microcomputer 53 from the injectors 10 of the cylinders are used to correct the sensor signals and controlled parameters for fuel injection control. Thereby, the fuel injection is controlled.

Hereinafter, an example of the fuel injection control performed in the injector driving system 1 will be described. When the ID assigning process of S200 is completed, all the electric potentials of the sensor output lines #1 to #4 of the injectors 10 are High. That is, all the transistors Tr1 are OFF. In addition, since a Sleep command is issued at the end of step S400, in which the characteristic values are read, the sensor output lines of the injectors 10 are returned to the "sensor outputting state". That is, the transistors Tr2 are OFF, and the transistors Tr1 are ON.

Therefore, when the fuel injection is controlled, sensor signals are always outputted from the sensor output lines #1 to #4 to the A/D converters 53*a*. Then, the microcomputer 53 controls the fuel injection by using the characteristic value read in the above process and the sensor signal received from the injector 10 to be controlled. The fuel injection control may be performed by using information other than the characteristic value and the sensor signal as a matter of course.

Next, a Write process in which a learning value is written into the EEPROM 13 will be described. The writing process is performed, for example, after the ignition key is turned off and the engine is stopped. First, the microcomputer 53 completes the fuel injection control and outputs a Wake-Up command. Then, the microcomputer 53 waits until all cylinder sensors become "non-outputting state" (which corresponds to step S220). The communication processing sections 17 receive Wake-Up commands via the communication line LC and perform the process of step S110 in which the sensor output lines are set to "sensor non-outputting state". When the communication processing sections 17 perform the process of step S110, the microcomputer 53 outputs a Write command and a node ID to be rewritten to the communication line LC. Then, all the communication processing sections 17 perform the process of S140. The communication processing section 17 corresponding to the node ID to be rewritten determines that it is "Yes" in step S143, because its ID agrees with the node ID received. Therefore, the Write process of step S147 is performed. The above process is performed for all the node IDs. Thereby, the characteristic values of the EEPROMs 13 of the injectors 10 are updated. Note that the characteristic value is the information indicating the individual difference of each of the injectors 10.

In the above description, the injector driving system 1 of the present embodiment is described. In the injector driving system 1, the electric potential of the sensor output line LS connected to the injector 10 which is the destination of an ID registration command is set to Low, and the electric potentials of the sensor output lines LS connected to the injectors 10 which are not the destination of the ID registration command are kept High. In this state, the electronic control unit 50 outputs the ID registration command to the communication line LC. This allows the injectors 10 of the cylinders to determine whether or not the destination of the ID registration command is the injector 10 itself. In addition, node IDs to be registered can be individually specified for the injectors 10, in to which a node ID is not registered, via the communication line LC.

Therefore, according to the injector driving system 1 of the present embodiment, node IDs are not required to be registered in the injectors 10 before the injectors 10 are incorporated in the system. In consequence, disadvantages due to connecting the injector 10 having an incorrect node ID to the sensor output line LS of the cylinder can be overcome.

According to the present embodiment, the electronic control unit 50 can transmit various commands to the specified injector 10 by changing the states of the sensor output lines LS without assigning node IDs to the injectors 10 in principle. Therefore, the system can be configured so that characteristic values can be read from the EEPROMs 13 of the injectors 10 and learning values can be written in the EEPROMs 13 without assigning the node IDs.

However, when a node ID is not assigned to the injector 10, the electric potential of the sensor output line LS is required to be changed every time communication is performed. Therefore, in the present embodiment, a node ID is assigned to each injector 10 in the initial process. After the node IDs are assigned, the electronic control unit 50 can transmit a command to the specified injector 10 by a software process using the node ID without changing the electric potential.

Therefore, in the present embodiment, disadvantages due to connecting the injector 10 having an incorrect node ID to the sensor output line LS of the cylinder can be overcome. In addition, after the node ID is assigned, the communication between the electronic control unit 50 and the injector 10 can be easily performed as in the conventional case.

A sensor unit with a communication function of the present invention corresponds to the injector 10 provided with the pressure sensor 11 and the communication driver 15. A signal line corresponds to the sensor output line LS. A transmission controlling means is realized by the processes of steps S231 to S265 which are performed by the microcomputer 53 of the electronic control unit 50. A main transmission controlling means is realized by the process of step S400.

In addition, a reception controlling means is realized by the processes of steps S133 and S137 which are performed by the communication processing section 17. A main reception controlling means is realized by the processes of steps S143 and S147 which are performed by the communication processing section 17. A stop requiring means is realized by the process of step S210 in which a Wake-Up command is transmitted as stop requiring data. An output stopping means is realized by the process of step S110 which is performed by the communication processing section 17 of the injector 10.

It will be appreciated that the present invention is not limited to the configurations described above, but any and all modifications, variations or equivalents, which may occur to those who are skilled in the art, should be considered to fall within the scope of the present invention.

For example, although the present invention is applied to the injector driving system, the present invention can be applied to not only the control system in which an electronic control unit and injectors are connected by a bus but also other various control systems.

In the above embodiment, after the node IDs are assigned to the injectors 10, sensor outputs are stopped even when the communication is performed in a state where the destination is specified by using the node ID. However, when performing the communication in a state where the destination is specified by using the node ID, information of the destination of communication data is not required to be provided to the injector 10 via the sensor output line LS. Therefore, in this case, the injector driving system 1 may be configured not to stop the sensor outputs.

According to the system configured as described above, after assigning the node IDs to the injectors 10, the electronic control unit 50 can communicate with the injectors 10, while the electronic control unit 50 receives sensor signals from the injectors 10.

In the above embodiment, the injector driving system 1 is described in which the electronic control unit 50 and the electronic drive unit 30 are separately provided. However, the electronic control unit 50 and the electronic drive unit 30 may be integrally provided in the injector driving system.

Aspects of the above-described embodiments will now be summarized.

According to the above embodiments, the conventional problem described above can be overcome by employing a technique in which communication is performed without using a node ID or a technique in which communication is performed using a node ID. In the latter technique, the node ID is assigned to a sensor unit after the sensor unit is physically connected to an electronic control unit.

The above embodiments are based on a control system having a plurality of sensor units and an electronic control unit. The sensor unit includes a sensor and a communication device. The electronic control unit is connected to the communication devices included in the sensor units via a common communication line (bus line) and can communicate with each of the sensor units. In the control system, the electronic control unit is connected to the sensors included in the sensor units via signal lines, which transmit sensor signals outputted from the sensors, individually provided for the sensor units. The sensor signals outputted from the sensor units are received by the electronic control unit via the individual signal lines provided for the sensor units.

Specifically, the electronic control unit comprises a transmission controlling means which sets the signal line connected to the sensor unit which is a destination of communication data to a first state, sets the signal line connected to the sensor unit which is not the destination of the communication data to a second state, and transmits the communication data to the sensor unit, which is the destination, via the communication line. The electronic control unit changes the state of the signal line to send information of the destination of the communication data to the sensor unit.

The sensor unit comprises a reception controlling means which determines a state of the signal line connecting the sensor included in the sensor unit to the electronic control unit. When the reception controlling means determines that the signal line of the sensor unit is in the first state, the reception controlling means receives the communication data received by the communication device and performs a predetermined process based the communication data. When the reception controlling means determines that the signal line of the sensor unit is in the second state, the reception controlling means discards the communication data received by the communication device.

When the communication line is common to the sensor units, communication data transmitted from the electronic control unit is received by all the sensor units connected to the communication line. Therefore, according to the conventional techniques, communication data cannot be transmitted to the specified sensor unit without providing a node ID of a destination to the communication data.

Conversely, according to the above embodiment, the states of the signal lines individually provided for sensor units are changed to provide information of the destination of the communication data from the electronic control unit to the sensor unit. In consequence, the communication data can be transmitted from the electronic control unit to the specified sensor unit without using a node ID.

Therefore, according to the above embodiment, when configuring the control system, a node ID is not required to be assigned to the sensor unit in advance. This prevents disadvantages from arising due to incorrect mounting of the sensor unit.

In the control system, the transmission controlling means can change the electric state of the signal line, specifically, an electric potential of the signal line, as the state of the signal line. However, when an electric potential of the signal line is changed as the state of the signal line, transmitting a sensor signal via the signal line causes disadvantages when transmitting communication data.

Therefore, it is preferable that the electronic control unit is provided with a stop requiring means which transmits, via the communication line, stop requiring data for requiring the sensor unit to stop outputting the sensor signal to the signal line before the transmission controlling means operates, and each of the sensor units comprises an output stopping means which stops outputting the sensor signal from the sensor to the signal line when the communication device receives the stop requiring data.

That is, it is preferable that the transmission controlling means, which specifies the destination depending on the state of the signal line, of the electronic control unit operates for signal lines corresponding to the sensor units after the electronic control unit receives sensor signals via the signal lines.

According to the above configuration of the electronic control unit and the sensor units, the electronic control unit can transmit information of the destination of communication data to the sensor unit, whereby a node Id is not required to be used. Therefore, disadvantages can be prevented from arising due to incorrect mounting of a sensor unit by the simple configuration.

Incidentally, in the above control system, the electronic control unit can individually transmit communication data to the sensor units without assigning node IDs to the sensor units. However, when using the above technique, the states of the signal lines are required to be changed. Therefore, in the above control system, it is preferable that after node IDs are assigned to the sensor units by using the above technique, the electronic control unit communicates with the sensor units by the conventional technique by using node IDs.

That is, it is preferable that, by using the above technique, the transmission controlling means of the electronic control unit performs a process in which one of the sensor units is selected as a destination, and registration (setting) requiring data, which is the communication data for requiring the sensor unit (destination) to register (set) a node ID, including information of the node ID assigned to the sensor unit is transmitted. The process is performed for each of the sensor units, which are connected to the communication line, as a destination.

In addition, it is preferable that after the communication device receives the registration requiring data, when the reception controlling means of the sensor unit determines that the signal line of the sensor unit is in the first state, the reception controlling means performs a process, in which a node ID indicated by the registration requiring data received by the communication device is registered as a node ID of the sensor unit, based on the communication data.

In addition to the above configuration, it is preferable that the electronic control unit comprises a main transmission controlling means which transmits communication data including the node ID of the sensor unit, which is the destination, to the sensor unit via the communication line, as well as the transmission controlling means, and each of the sensor units comprises a main reception controlling means, as well as the reception controlling means. After the communication device receives the communication data including the node ID of the sensor unit, which is the destination, the main reception controlling means determines whether or not the node ID included in the communication data agrees with the node ID of the sensor unit. When the main reception controlling means determines that the node ID included in the communication data agrees with the node ID of the sensor unit, regardless of the state of the signal line, the main reception controlling means receives the communication data received by the communication device and performs a predetermined process based on the communication data. When the main reception controlling means determines that the node ID included in the communication data does not agree with the node ID of the sensor unit, the main reception controlling means discards the communication data received by the communication device.

In the control system including the above electronic control unit and the sensor units, after the transmission controlling means assigns node IDs to the sensor units connected to the communication line, the main transmission controlling means transmits communication data to the sensor unit by using the node ID. According to the configuration, the states of the signal lines are not required to be changed when the electronic control unit communicates with the sensor unit.

In addition, the node ID is assigned to the sensor unit after the electronic control unit and the sensor unit are physically connected. Therefore, conventional incorrect mounting of the sensor unit does not occur, thereby preventing disadvantages from arising due to the incorrect mounting of the sensor unit.

Each of the means described above can be realized by a program executed by a computer.

What is claimed is:

1. A control system having a plurality of sensor units and an electronic control unit, each of the sensor units including a sensor and a communication device, the electronic control unit being connected to communication devices included in the sensor units via a common communication line, and the electronic control unit being connected to sensors included in the sensor units via signal lines individually provided for the sensor units, wherein the electronic control unit comprises a transmission controlling means which sets a signal line connected to a sensor unit, which is a destination of communication data, to a first state, sets the signal line connected to the sensor unit, which is not the destination of the communication data, to a second state, and transmits the communication data to the sensor unit, which is the destination, via the communication line, each of the sensor units comprises a reception controlling means which determines a state of the signal line connecting the sensor included in the sensor unit to the electronic control unit, when the reception controlling means determines that the signal line of the sensor unit is in the first state, the reception controlling means receives communication data received by the communication device and performs a predetermined process based on the communication data, and when the reception controlling means determines that the signal line of the sensor unit is in the second state, the reception controlling means discards the communication data received by the communication device;

the electronic control unit further comprises a stop requiring means which transmits, via the communication line, stop requiring data for requiring the sensor unit to stop outputting a sensor signal to the signal line before the transmission controlling means operates, each of the sensor units comprises an output stopping means which stops outputting the sensor signal from the sensor to the signal line when the communication device receives the stop requiring data, and the transmission controlling means of the electronic control unit operates after the electronic control unit receives the sensor signal via the signal line corresponding to the sensor unit.

2. A control system having a plurality of sensor units and an electronic control unit, each of the sensor units including a sensor and a communication device, the electronic control unit being connected to communication devices included in the sensor units via a common communication line, and the electronic control unit being connected to sensors included in the sensor units via signal lines individually provided for the sensor units, wherein the electronic control unit comprises a transmission controlling means which sets a signal line connected to a sensor unit, which is a destination of communication data, to a first state, sets the signal line connected to the sensor unit, which is not the destination of the communication data, to a second state, and transmits the communication data to the sensor unit, which is the destination, via the communication line, each of the sensor units comprises a reception controlling means which determines a state of the signal line connecting the sensor included in the sensor unit to the electronic control unit, when the reception controlling means determines that the signal line of the sensor unit is in the first state, the reception controlling means receives communication data received by the communication device and performs a predetermined process based on the communication data, and when the reception controlling means determines that the signal line of the sensor unit is in the second state, the reception controlling means discards the communication data received by the communication device;

the transmission controlling means of the electronic control unit performs a process in which one of the sensor units is selected as a destination, and registration requiring data, which is the communication data for requiring the selected one of the sensor units to register a node ID, including information of a node ID of the sensor unit is transmitted, the process being individually performed for each of the sensor units connected to the communication line, after the communication device receives the registration requiring data, when the reception controlling means of the sensor unit determines that the signal line of the sensor unit is in the first state, the reception controlling means performs a process, in which a node ID indicated by the registration requiring data received by the communication device is registered as a node ID of the sensor unit, based on the communication data, when the reception controlling means of the sensor unit determines that the signal line of the sensor unit is in the second state, the reception controlling means discards the registration requiring data received by the communication device, the electronic control unit comprises a main transmission controlling means which transmits communication data including the node ID of the sensor unit, which is the destination, to the sensor unit via the communication line, each of the sensor units comprises a main reception controlling means, after the communication device receives the communication data including the node ID of the sensor unit, which is the destination, the main reception controlling means determines whether or not the node ID included in the communication data agrees with the node ID of the sensor unit, when the main reception controlling means determines that the node ID included in the communication data agrees with the node ID of the sensor unit, regardless of the state of the signal line, the main reception controlling means receives the communication data received by the communication device and performs a predetermined procedure based on the communication data, and when the main reception controlling means determines that the node ID included in the communication data does not agree with the node ID of the sensor unit, the main reception controlling means discards the communication data received by the communication device.

3. An electronic control unit configured to communicate with a plurality of sensor units each of which includes a sensor and a communication device, the electronic control unit being connected to communication devices included in the sensor units via a common communication line and being connected to sensors included in the sensor units via signal lines individually provided for the sensor units, and a signal line transmitting a sensor signal which is an output signal of the sensor, comprising:

a transmission controlling means which sets a signal line connected to a sensor unit, which is a destination of communication data, to a first state, sets the signal line connected to the sensor unit, which is not the destination of the communication data, to a second state, and transmits the communication data to the sensor unit, which is the destination, via the communication line.

4. The electronic control unit according to claim 3, further comprising a stop requiring means which transmits, via the communication line, stop requiring data for requiring the sensor unit to stop outputting the sensor signal to the signal line, wherein the transmission controlling means operates, after each of the sensor units connected to the communication line performs a predetermined process based on the stop requiring data whereby the electronic control unit receives the sensor signal via the signal line corresponding to the sensor unit.

5. The electronic control unit according to claim 3, wherein the transmission controlling means performs a process in which one of the sensor units is selected as a destination, and registration requiring data, which is the communication data for requiring the selected one of the sensor units to register a node ID, including information of a node ID assigned to the sensor unit is transmitted, the process being individually performed for each of the sensor units connected to the communication line, the electronic control unit comprises a main transmission controlling means which transmits communication data including the node ID assigned to the sensor unit, which is the destination, to the sensor unit via the communication line, and after the node ID is assigned to each of the sensor units connected to the communication line, the main transmission controlling means transmits communication data to the sensor unit.

6. A communication method used in a control system having a plurality of sensor units and an electronic control unit, the sensor units including a sensor and a communication device, the electronic control unit being connected to communication devices included in the sensor units via a common communication line, and the electronic control unit being connected to sensors included in the sensor units via signal lines individually provided for the sensor units, comprising:

performing a first process in which a first step and a second step are repeated a predetermined number of times, the predetermined number being equal to the number of the sensor units, while changing a destination of communication data, to assign a node ID to each of the sensor units, the first step including, setting a signal line connected to a sensor unit which is the destination of the communication data to a first state, and setting the signal line connected to the sensor unit which is not the destination of the communication data to a second state, the second step including, transmitting the communication data including information of the node ID to the sensor unit via the communication line, and performing a second process in which, after the first process, all the signal lines are set to the second state to allow the electronic control unit to receive the sensor signals of all the sensor units.

* * * * *